(12) United States Patent
Bomma et al.

(10) Patent No.: US 8,612,381 B2
(45) Date of Patent: Dec. 17, 2013

(54) ENHANCED SYNCHRONIZATION FRAMEWORK PROVIDING IMPROVED SYNC GRANULARITY

(75) Inventors: Shashidhar Bomma, Austin, TX (US); Brian W. Hart, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 545 days.

(21) Appl. No.: 12/209,375

(22) Filed: Sep. 12, 2008

(65) Prior Publication Data

US 2010/0070469 A1 Mar. 18, 2010

(51) Int. Cl.
G06F 17/30 (2006.01)
G06F 7/00 (2006.01)

(52) U.S. Cl.
USPC .......................................... 707/609; 707/610

(58) Field of Classification Search
USPC .................................................. 707/609, 610
See application file for complete search history.

(56) References Cited

U.S. PATENT DOCUMENTS

| | | | | |
|---|---|---|---|---|
| 5,603,019 A | * | 2/1997 | Kish | 707/757 |
| 7,430,633 B2 | * | 9/2008 | Church et al. | 711/112 |
| 7,558,925 B2 | * | 7/2009 | Bouchard et al. | 711/154 |
| 7,567,990 B2 | * | 7/2009 | Mitchell et al. | 1/1 |
| 7,689,510 B2 | * | 3/2010 | Lamkin et al. | 705/51 |
| 2003/0159136 A1 | | 8/2003 | Huang et al. | 717/171 |
| 2004/0221134 A1 | * | 11/2004 | Chen et al. | 711/220 |
| 2007/0016586 A1 | | 1/2007 | Samji et al. | 707/10 |
| 2007/0299881 A1 | | 12/2007 | Bouganim | 707/200 |
| 2008/0288506 A1 | * | 11/2008 | Brown | 707/10 |

FOREIGN PATENT DOCUMENTS

| | | |
|---|---|---|
| JP | H01-125631 A | 5/1989 |
| JP | H06-012302 A | 1/1994 |
| JP | H07-191895 A | 7/1995 |
| JP | H09-212380 A | 8/1997 |
| JP | 2002-157158 A | 5/2002 |
| JP | 2004-005092 A | 1/2004 |
| JP | 2005504387 A | 2/2005 |
| JP | 2006-244484 A | 9/2006 |

* cited by examiner

*Primary Examiner* — Kannan Shanmugasundaram
(74) *Attorney, Agent, or Firm* — VanLeeuwen & VanLeeuwen; John D. Flynn (57) ABSTRACT

A sync manager invokes a scheduled sync task that includes filter attributes for filtering a plurality of memory pages into a subset of memory pages. The sync manager selects file pointers that correspond to a plurality of files and traverses through the files using the selected file pointers. While traversing, the sync manager extracts file attributes for each of the files and, in turn, filters the files by comparing the filter attributes with the extracted file attributes. The sync manager then extracts memory page identifiers that correspond to the filtered files and synchronizes a subset of memory pages using the extracted memory page identifiers.

20 Claims, 10 Drawing Sheets

Table 500

| Task Name | Filter Attributes | Schedule Attributes |
|---|---|---|
| Sync Task A | db2 files, >2GB, updated after 1/1/08 | start time 2:00AM, every 45 sec |
| Sync Task B | exclude db2 files | start time 12:00PM, every 120 sec |
| : | : | : |
| : | : | : |

ENHANCED SYNCHRONIZATION FRAMEWORK PROVIDING IMPROVED SYNC GRANULARITY

TECHNICAL FIELD

The present invention relates to an enhanced synchronization framework that provides improved synchronization granularity. More particularly, the present invention relates to filtering active memory pages into a subset of memory pages based upon user-specified filter criteria and synchronizing only the subset of memory pages during a scheduled synchronization event.

BACKGROUND OF THE INVENTION

Description of the Related Art

A computer system periodically synchronizes pages of memory with a hard disk in order to maintain the integrity of the computer system. In many cases, a "sync" operation may attempt to synchronize an overly large number of memory pages with the hard disk.

SUMMARY

A sync manager invokes a scheduled sync task that includes filter attributes for filtering a plurality of memory pages into a subset of memory pages. The sync manager selects file pointers that correspond to a plurality of files and traverses through the files using the selected file pointers. While traversing, the sync manager extracts file attributes for each of the files and, in turn, filters the files by comparing the filter attributes with the extracted file attributes. The sync manager then extracts memory page identifiers that correspond to the filtered files and synchronizes a subset of memory pages using the extracted memory page identifiers.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
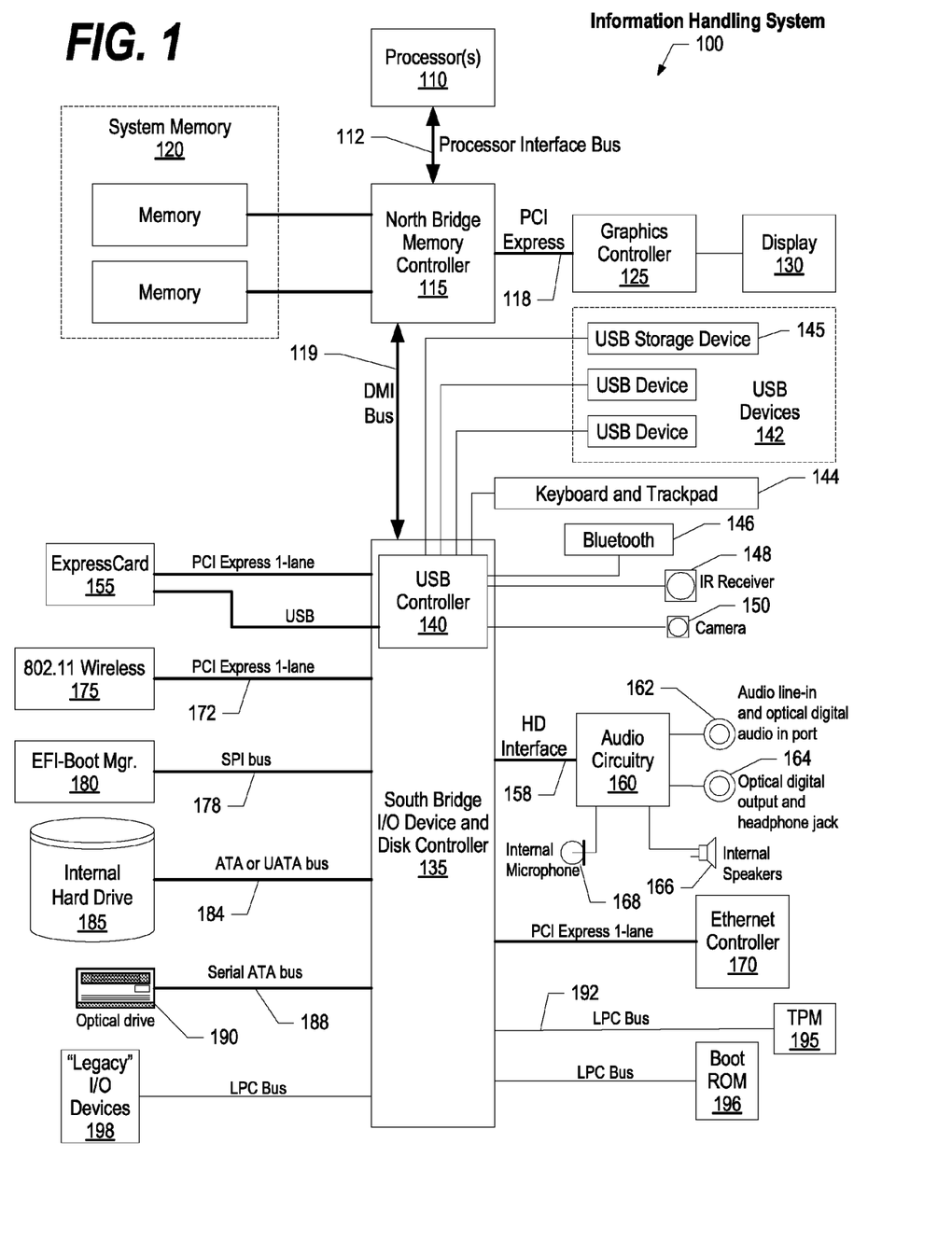
FIG. 1 is a block diagram of a data processing system in which the methods described herein can be implemented.
Figure 2:
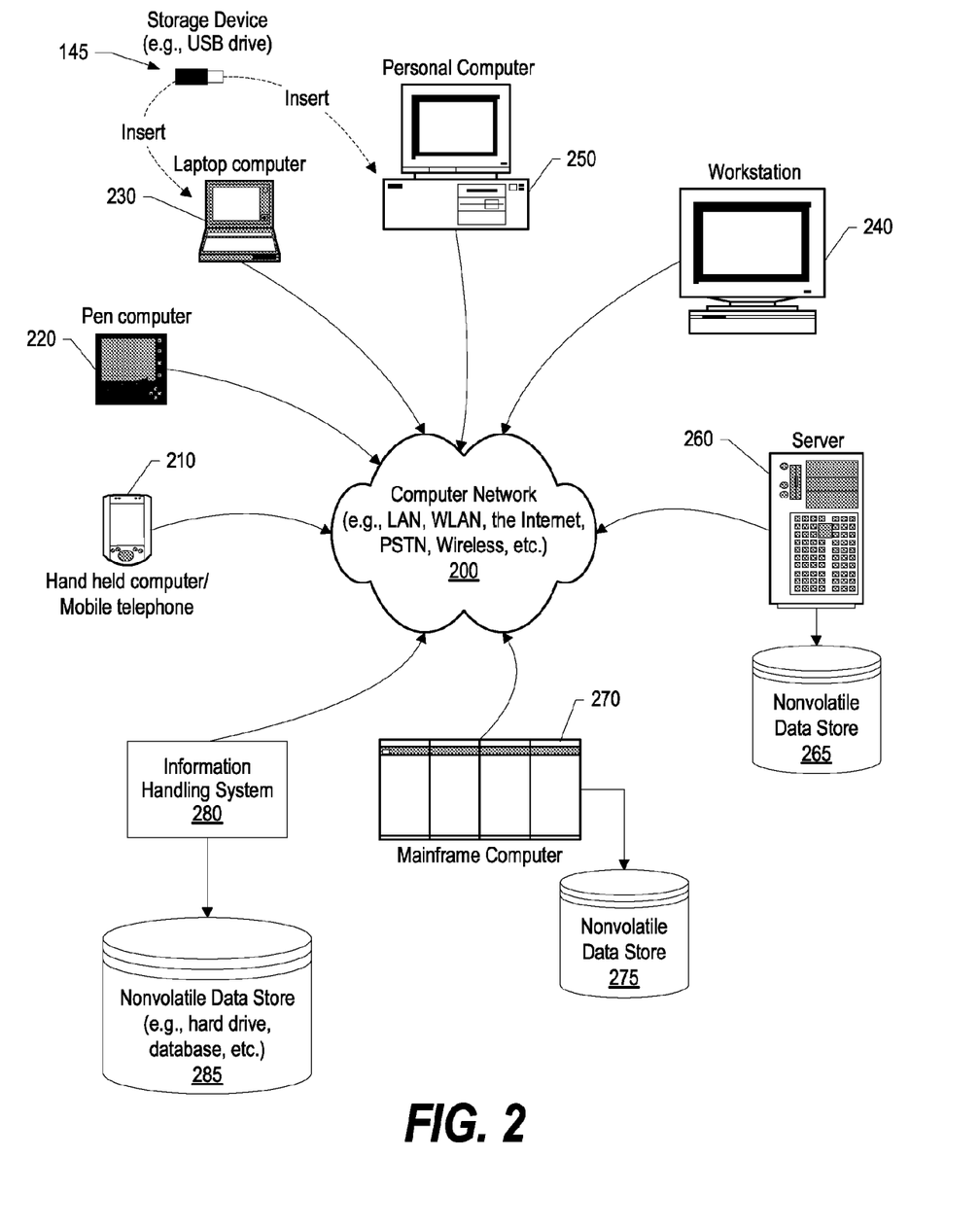
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
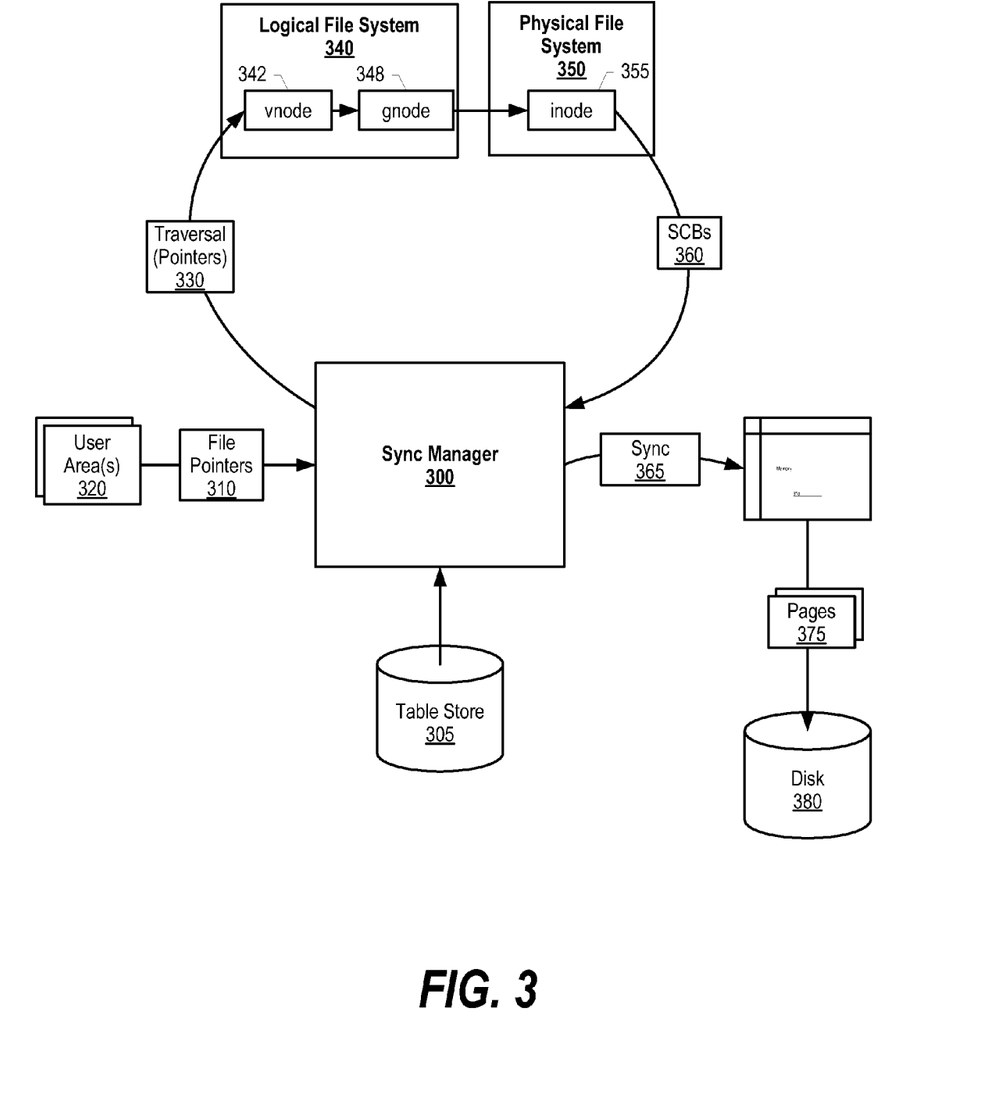
FIG. 3 is a diagram showing a sync manager utilizing an enhanced sync framework in order to synchronize a subset of memory pages based upon one or more filter attributes.

FIG. 3 is a diagram showing a sync manager utilizing an enhanced sync framework in order to synchronize a subset of memory pages based upon one or more filter attributes. A user configures scheduled sync tasks that include filter attributes, which are stored in table store 305 (see FIGS. 4, 6, and corresponding text for further details). The scheduled sync tasks include filter attributes such as an application inclusion filter, an application exclusion filter, a file size filter, and a last update filter. The application inclusion filter instructs sync manager 300 to synchronize memory pages that correspond to a particular application. The application exclusion filter instructs sync manager 300 to not synchronize memory pages that correspond to a particular application. The file size filter instructs sync manager 300 to synchronize memory pages that correspond to files that are a particular size (e.g., greater than 2 GB). And, the last update filter instructs sync manager 300 to synchronize memory pages that correspond to a file that has last been updated at a particular time (e.g. greater than one day). Table store 305 may be stored on a nonvolatile storage area, such as a computer hard drive.

Sync manager 300 retrieves a scheduled sync task from table store 305 and identifies the scheduled sync task's filter attributes. When the filter attributes specify a particular application, sync manager 300 identifies user areas 320 that correspond to the particular application's processes, and extracts file pointers 310 from user areas 320. File pointers 310 correspond to files utilized by the particular application. When the filter attributes do not specify an application, sync manager 300 may select all of the active file pointers.

Next, sync manager 300 performs traversal 330 using the file pointers (file pointers 310 or all active file pointers) to traverse through corresponding vnode data structures 342 and gnode data structures 348 included in logical file system 340. Next, sync manager 300 utilizes information obtained while traversing through logical data structure 340 and traverses through inode data structures 355 included in physical file system 350 (e.g., user block (ublock) information). While traversing through inode data structures 355, processing extracts segment control blocks 360, which include memory page identifiers. As such, the memory page identifiers included in segment control blocks 360 correspond to the file pointers included in traversal 330.

Once sync manager 300 obtains the memory page identifiers, sync manager 300 may perform additional filtering using other filter attributes included in the scheduled sync task. For example, the scheduled sync task may include a file size filter and, in this case, sync manager 300 compares file size information obtained while traversing inode 355 to determine which memory pages to synchronize. As another example, the scheduled sync task may include a last update filter and, in this case, sync manager 300 compares file update information obtained while traversing inode 355 to determine which memory pages to synchronize.

Once sync manager 300 filters the memory pages down to a subset of memory pages, sync manager 300 synchronizes (sync 365) the subset of memory pages (pages 375) by copying the memory pages from memory 370 onto disk 380. As a result, sync manager 300 is able to synchronize a subset of the memory pages without having to synchronize all active memory pages, thus taking a shorter amount of time and alleviating input/output bottlenecks.

Figure 4:
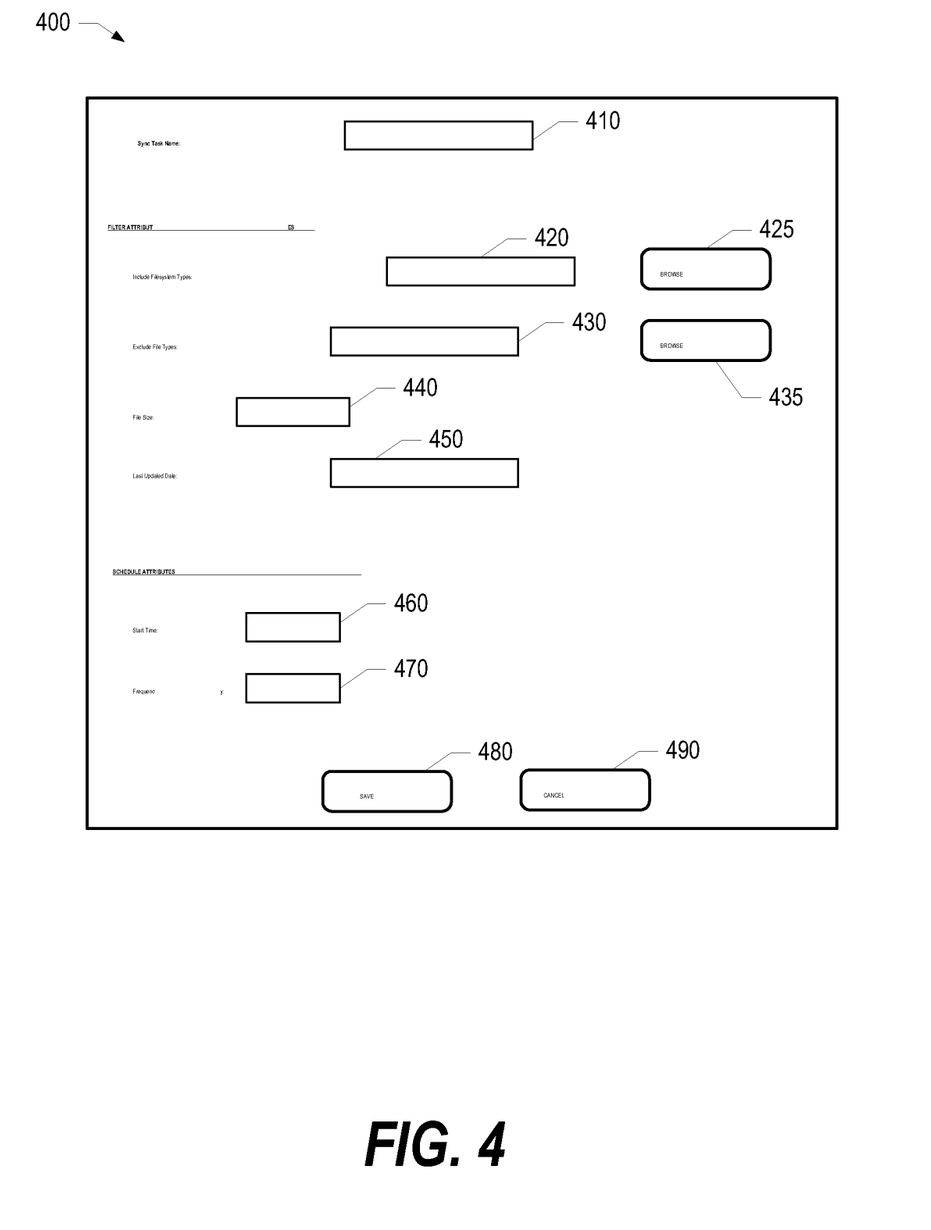
FIG. 4 is a diagram showing a user interface window to creating and configuring a scheduled sync task.

FIG. 4 is a diagram showing a user interface window to creating and configuring a scheduled sync task. Window 400 includes areas for a user to configure a scheduled sync task using one or more filter attributes. When a sync manager provides the user with window 400, the user enters a sync task name in box 410, such as "syncdb2pages."

Next, the user may enter one or more filter attributes in boxes 420 through 450. When the user wishes to synchronize memory pages utilized by a particular application, the user enters file system types corresponding to the application in box 420 to include in the synchronization, which results in an application inclusion filter. The user may also select button 425 to browse for particular files. When the user wishes to exclude memory pages utilized by a particular application, the user enters file system types corresponding to the application in which to exclude in box 430, which results in an application exclusion filter. The user may also select button 425 to browse for particular files in which to exclude.

The user may also enter a file size filter in box 440 that filters memory pages to synchronize based upon their corresponding file's size, such as "greater than 2 GB." When the user wishes to specify memory page synchronization based upon a file's last update date, the user enters a last update date filter in box 450.

The user may also configure a time at which to perform the scheduled sync task by entering a specified start time in box 460 and configure the frequency at which to synchronize by entering a frequency occurrence in box 470 (e.g., every 45 seconds). Once the user finishes entering filter attributes and schedule attributes, the user selects button 480 to save the scheduled sync task. The user may also select button 490 to cancel the scheduled sync task creation and configuration.

Figure 5:
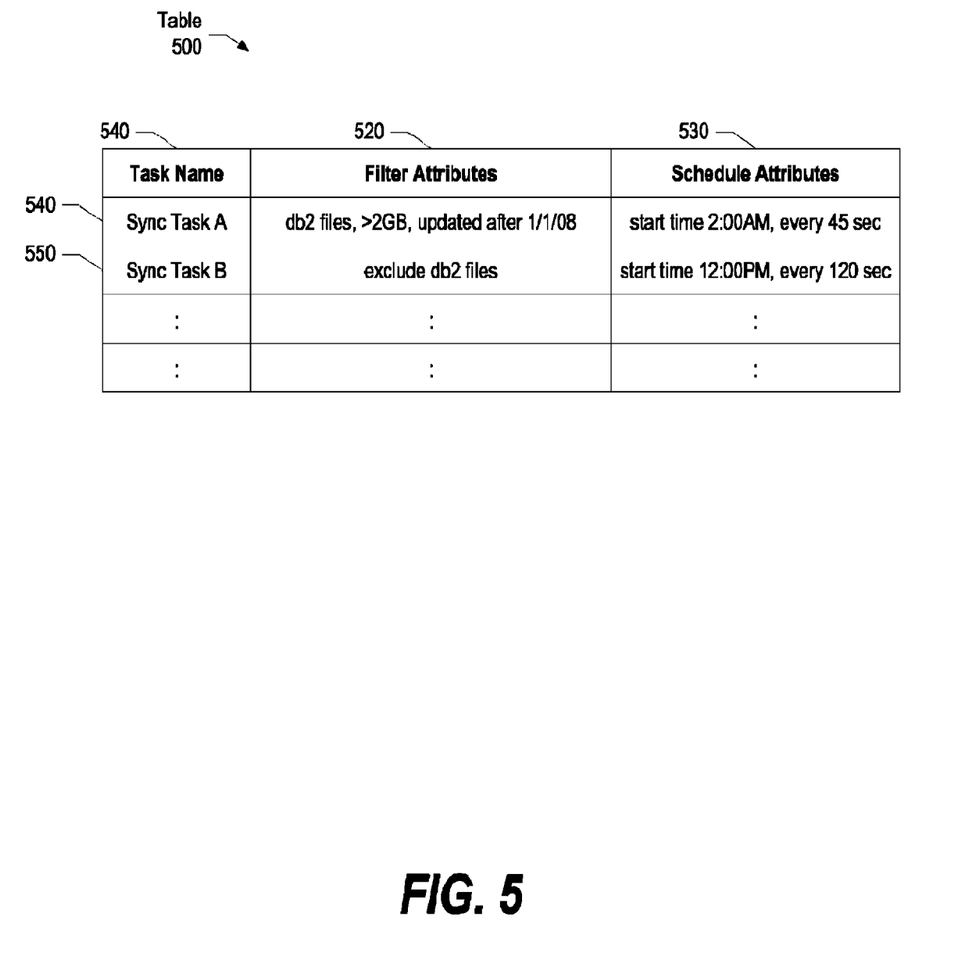
FIG. 5 is a diagram showing a sync table that stores scheduled sync tasks.

FIG. 5 is a diagram showing a sync table that stores scheduled sync tasks. When a user creates a scheduled sync task, such as by using a user interface window shown in FIG. 4, a sync manager stores the scheduled sync task in a table such as table 500.

Table 500 includes column 510, which includes a list of scheduled sync task names specified by the user. Column 520 includes a list of filter attributes for the particular scheduled sync tasks and column 530 includes a list of scheduled attributes for the particular scheduled sync tasks. Row 540 shows that "sync task A" includes an application inclusion filter of "db2 files," a file size filter of ">2 GB,", and a last update filter of "after Jan. 1, 2008." Row 540 also shows that "sync task A" includes a specified start time schedule attribute of "2:00 AM" and a frequency occurrence schedule attribute of "every 45 seconds."

Likewise, row 550 shows that "sync task B" includes an application exclusion filter of "db2 files," a specified start time schedule attribute of "12:00 PM" and a frequency occurrence schedule attribute of "every 120 seconds." The sync manager utilizes the scheduled sync task filter attributes in order to identify a subset of memory pages in which to synchronize at a time that is based upon the schedule attributes (see FIGS. 9-10 and corresponding text for further details).

Figure 6:
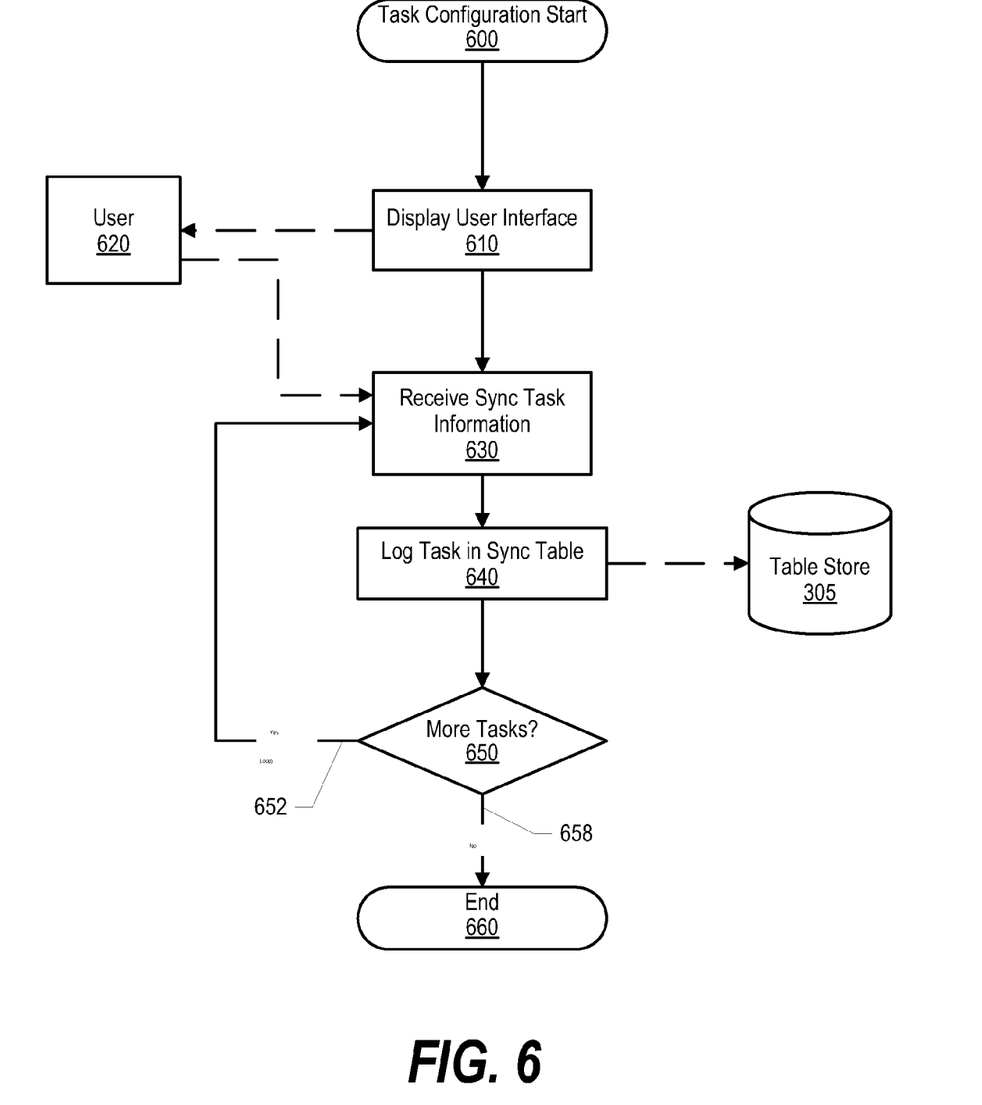
FIG. 6 is a flowchart showing steps taken in configuring a scheduled sync task that includes filter attributes for identifying a subset of memory pages to synchronize.

FIG. 6 is a flowchart showing steps taken in configuring a scheduled sync task that includes filter attributes for identifying a subset of memory pages to synchronize. Processing commences at 600, whereupon processing displays a user interface to user 620, such as the example shown in FIG. 4 (step 610). Processing receives filter attributes from user 620 that specify which file type memory pages in which to synchronize (step 630). For example, the filter attributes may include an application inclusion filter to synchronize all memory pages utilized by a db2 application. Other filter attributes may include an application exclusion filter, a file size filter, and a last update filter. User 620 also provides a specified start time (e.g., 9:00 AM) and a frequency occurrence (e.g., every 60 seconds) (see FIG. 4 and corresponding text for further details).

Processing logs the scheduled sync task in table store 305 at step 640, which is subsequently utilized to schedule the sync task (see FIGS. 9-10 and corresponding text for further details). Table store 305 is the same as that shown in FIG. 3.

A determination is made as to whether user 620 wishes to create another scheduled sync task (decision 650). If user 620 wishes to create another scheduled sync task, decision 650 branches to "Yes" branch 652, which loops back to configure and store another scheduled sync task. This looping continues until user 620 is finished configuring scheduled sync tasks, at which point decision 650 branches to "No" branch 658 whereupon processing ends at 660.

Figure 7:
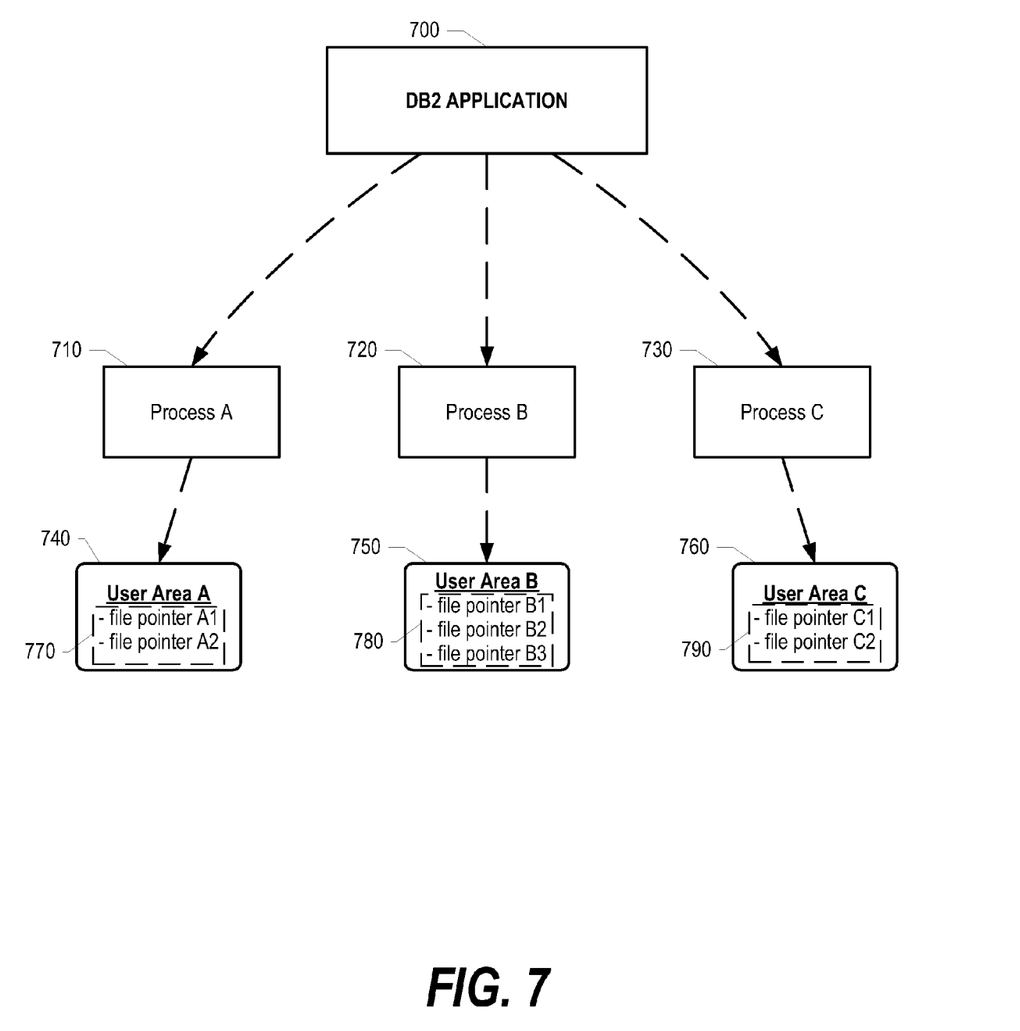
FIG. 7 is a diagram showing an application invoking active processes that, in turn, create user areas to log file pointers corresponding to utilized files.

FIG. 7 is a diagram showing an application invoking active processes that, in turn, create user areas to log file pointers corresponding to utilized files. Application 700 executes and invokes processes A 710, B 720, and C 730, which may represent separate instances of application 700. Each process creates a user area to log file pointers that correspond to files that a particular process utilizes. As can be seen, process A 710 creates user area A 740, which includes file pointers 770. Likewise, process B 720 creates user area B 750, which includes file pointers 780, and process C 730 creates user area C 760, which includes file pointers 790.

When a user specifies memory pages to synchronize for a particular application using an application inclusion filter, processing identifies processes invoked by the application, identifies the corresponding user areas, and extracts the file pointers from the user areas. Processing then utilizes the extracted file pointers to traverse through logical file systems and physical file systems in order to identify corresponding segment control buffers, which include memory pages that correspond to the files. Processing then synchronizes the memory pages with a hard disk (see FIGS. 8, 10, and corresponding text for further details).

Figure 8:
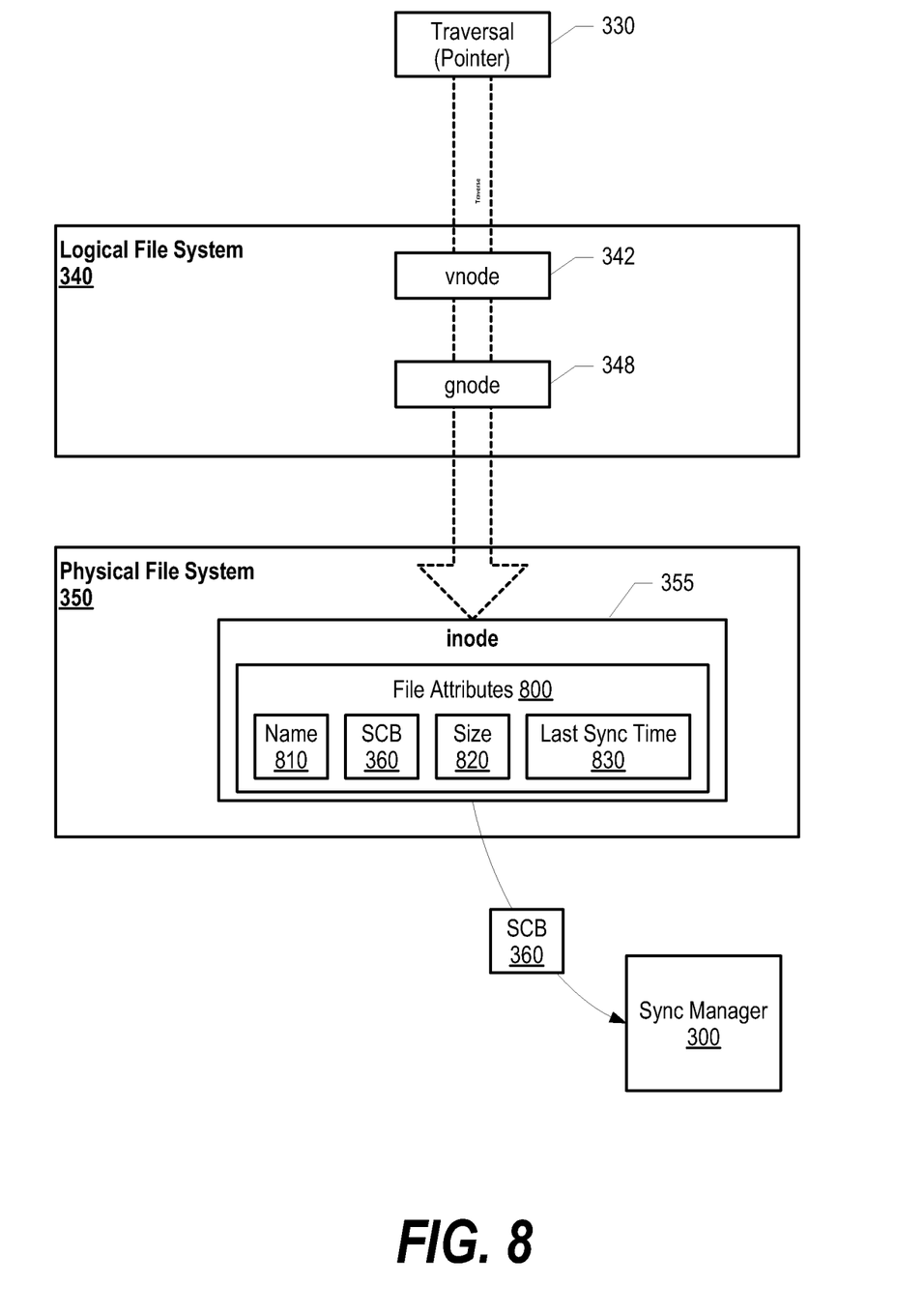
FIG. 8 is a diagram showing traversal through a logical file system and a physical file system in order to identify and extract file attributes that correspond to particular file pointers.

FIG. 8 is a diagram showing traversal through a logical file system and a physical file system in order to identify and extract file attributes that correspond to particular file pointers. A sync manager selects particular file pointers in which to synchronize their corresponding memory pages. The sync manager may utilize an application inclusion filter or an application exclusion filter to select the file pointers, or the sync manager may select all file pointers that correspond to currently opened files.

The sync manager performs traversal 330 using the selected file pointers to traverse through vnode data structures 342 (corresponding to the file pointers) and gnode data structures 348 (corresponding to the file pointers) included in logical file system 340. Based upon information received by traversing through logical file system 340, the sync manager is able to traverse through inode data structure 355 (corresponding to the file pointers).

Inode data structure 355 corresponds to a file and includes file attributes 800. File attributes 800 includes file name 810, segment control blocks 360, which includes memory page identifiers, file size 820, and last sync time 830. Sync manager 300 extracts segment control blocks 360 from file attributes 800 in order to identify appropriate memory pages (using the included memory page identifiers) in which to synchronize. Sync manager 300 may also extract other file attributes 800, such as size 820 or last sync time 830, in order to filter memory pages to synchronize based upon other filter attributes (see FIG. 10 and corresponding text for further details).

Figure 9:
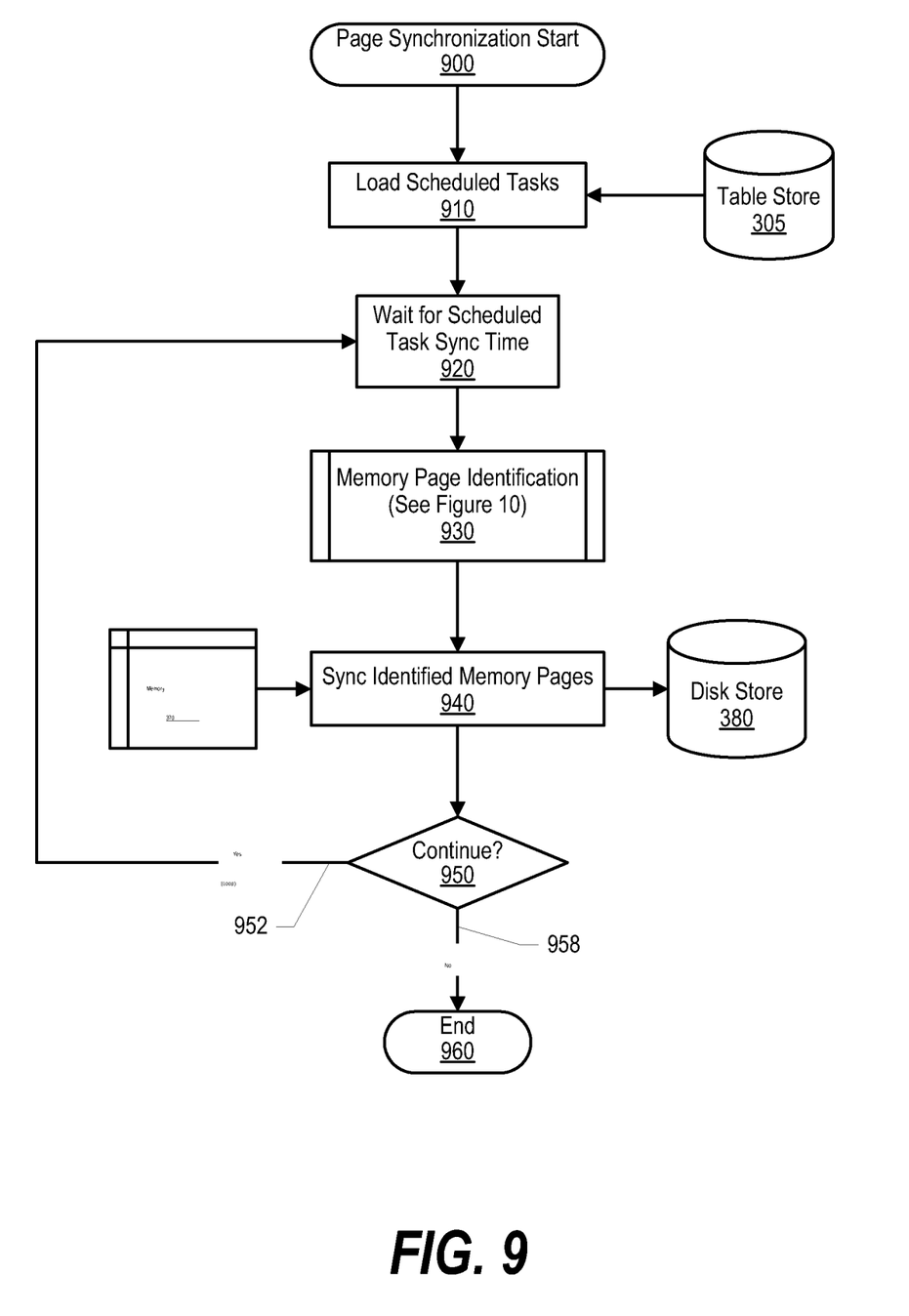
FIG. 9 is a high level flowchart showing steps taken in synchronizing a subset of memory pages.

FIG. 9 is a high level flowchart showing steps taken in synchronizing a subset of memory pages. Sync manager processing commences at 900, whereupon processing loads scheduled sync tasks included in table store 305 (step 910). A user previously created and configured the scheduled sync tasks, which each includes one or more filter attributes (see FIGS. 4-5, and corresponding text for further details). Table store 305 is the same as that shown in FIG. 3.

At step 920, processing waits for a time at which to invoke a scheduled sync task. For example, one of the scheduled sync tasks may include schedule attributes to start at 12:00 AM and execute at a frequency of every 60 seconds. Once the sync manager invokes the scheduled sync task, the sync manager proceeds through a series of steps to identify a subset of memory pages in which to synchronize based upon filter attributes included in the scheduled sync task (pre-defined process block 930, see FIG. 10 and corresponding text for further details).

After the sync manager identifies the appropriate memory pages, processing synchronizes the memory pages by copying the memory pages from memory 370 to disk store 380 (step 940). Memory 370 and disk store 380 are the same as that shown in FIG. 3.

A determination is made as to whether to continue waiting for and processing scheduled sync tasks (decision 950). If processing should continue, decision 950 branches to "Yes" branch 952, which loops back to process another scheduled sync task. This looping continues until processing should terminate, at which point decision 950 branches to "No" branch 958 whereupon processing ends at 960.

Figure 10:
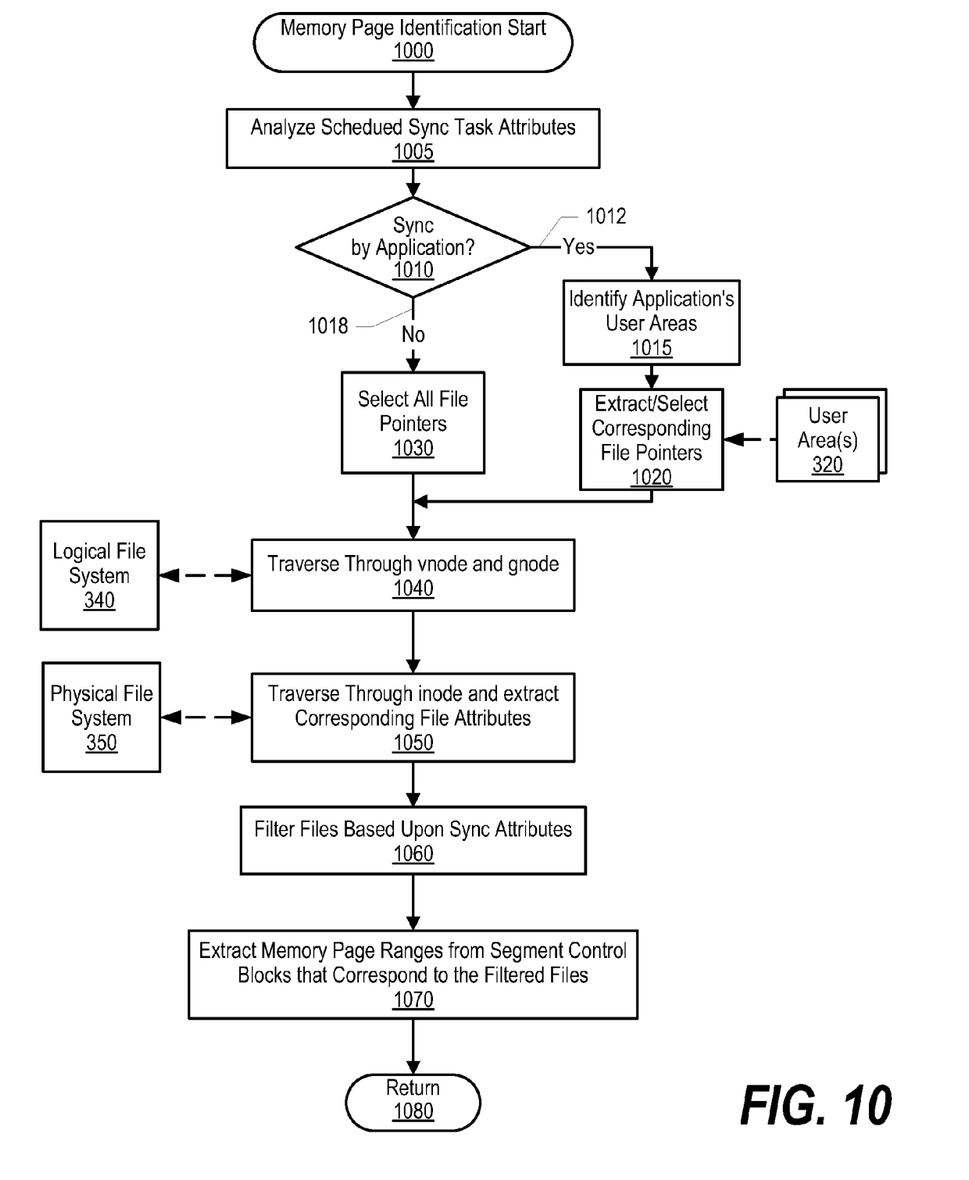
FIG. 10 is a flowchart showing steps taken in identifying a subset of memory pages in which to synchronize.

FIG. 10 is a flowchart showing steps taken in identifying a subset of memory pages in which to synchronize. Sync manager processing commences at 1000, whereupon processing analyzes a scheduled sync task's filter attributes at step 1005. A decision is made as to whether to synchronize memory pages based upon an application type (decision 1010). For example, the filter attributes may include an application inclusion filter or an application exclusion filter.

If processing should synchronize memory pages based upon an application type, decision 1010 branches to "Yes" branch 1012 whereupon processing identifies user areas that correspond to the application type (step 1015). For example, processing may identify the application's active processes and then identify user areas created by the active processes (see FIG. 7 and corresponding text for further details). At step 1020, processing extracts and selects file pointers that are included in the identified user areas 320. User areas 320 is the same as that shown in FIG. 3. On the other hand, if processing should not synchronize memory pages based upon an application type, decision 1010 branches to "No" branch 1018 whereupon processing selects all active file pointers at step 1030.

Once processing selects the file pointers, processing uses the file pointers to traverse through corresponding vnode data structures and gnode data structures included in logical file system 340 (step 1040). Next, using information obtained from traversing logical file system 340, processing traverses through corresponding inode data structures located in physical file system 350 and extracts file attributes from the corresponding inode data structures, such as segment control blocks, file size, etcetera (step 1050).

Processing filters files by comparing the file attributes with the filter attributes included in the scheduled sync task at step 1060. For example, processing may filter out files that are greater than 2 GB. At step 1070, processing extracts memory page identifiers from segment control blocks of the filtered files, which are the subset of memory pages in which to synchronize. These memory page identifiers may be in a range, such as "pages 1-100." Processing returns at 1080.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A machine-implemented method comprising:
    invoking a scheduled sync task that includes filter attributes to filter a plurality of memory pages corresponding to a plurality of files into a subset of memory pages;
    selecting a plurality of file pointers that correspond to the plurality of files;
    traversing through a logical file system using the selected plurality of file pointers, wherein the traversing includes analyzing a plurality of vnode data structures corresponding to the plurality of file pointers and obtaining logical file traversal information;
    traversing through a physical file system using the logical file traversal information and extracting file attributes for each of the plurality of files;
    filtering the plurality of files by comparing the filter attributes against the extracted file attributes;
    extracting memory page identifiers corresponding to the filtered plurality of files, wherein the extracted memory page identifiers identify the subset of memory pages to synchronize; and
    synchronizing the subset of memory pages using the extracted memory page identifiers.

2. The method of claim 1 wherein the selection of the plurality of file pointers further comprises:
    utilizing an application inclusion filter included in the filter attributes to identify an application;
    identifying one or more active processes that correspond to the application;
    identifying a user area for each of the identified one or more active processes; and
    extracting the selected plurality of file pointers from the identified one or more user areas.

3. The method of claim 1 wherein the filter attributes include a first application file type and exclude a second application file type.

4. The method of claim 1 further comprising:
    wherein the traversing of the physical file system includes analyzing a plurality of inode data structures included in the physical file system, the plurality of inode data structures corresponding to the plurality of files; and
    during the analysis, extracting segment control blocks from the plurality of inode data structures, wherein the segment control blocks include the memory page identifiers.

5. The method of claim 4 wherein traversing the logical file system further comprises:
    analyzing a plurality of gnode data structures.

6. The method of claim 1 wherein the filter attributes are selected from the group consisting of an application inclusion filter, an application exclusion filter, a file size filter, and a last update filter.

7. The method of claim 1 wherein the invoking is based upon a specified start time and a frequency occurrence that correspond to the scheduled sync task.

8. A peripheral device comprising:
    one or more processors;
    a memory accessible by at least one of the processors;
    a nonvolatile storage area accessible by at least one of the processors;
    a set of instructions stored in the memory and executed by at least one of the processors in order to perform actions of:
        invoking a scheduled sync task that includes filter attributes to filter a plurality of memory pages corresponding to a plurality of files into a subset of memory pages;
        selecting a plurality of file pointers that correspond to the plurality of files;
        traversing through a logical file system using the selected plurality of file pointers, wherein the traversing includes analyzing a plurality of vnode data structures corresponding to the plurality of file pointers and obtaining logical file traversal information;
        traversing through a physical file system using the logical file traversal information and extracting file attributes for each of the plurality of files;
        filtering the plurality of files by comparing the filter attributes against the extracted file attributes;
        extracting memory page identifiers corresponding to the filtered plurality of files, wherein the extracted memory page identifiers identify the subset of memory pages to synchronize; and
        synchronizing the subset of memory pages included in the memory with the non volatile storage area using the extracted memory page identifiers.

9. The peripheral device of claim 8 wherein the set of instructions performs actions of:
    utilizing an application inclusion filter included in the filter attributes to identify an application;
    identifying one or more active processes that correspond to the application;
    identifying a user area for each of the identified one or more active processes; and
    extracting the selected plurality of file pointers from the identified one or more user areas.

10. The peripheral device of claim 8 wherein the filter attributes include a first application file type and exclude a second application file type.

11. The peripheral device of claim 8 wherein, during the traversing of the physical file system, the set of instructions further performs actions of:

analyzing a plurality of inode data structures included in the physical file system, the plurality of inode data structures corresponding to the plurality of files; and during the analysis, extracting segment control blocks from the plurality of inode data structures, wherein the segment control blocks include the memory page identifiers.

12. The peripheral device of claim 11 wherein, during the traversing of the logical file system, the set of instructions further performs actions that include steps of:

analyzing a plurality of gnode data structures.

13. The peripheral device of claim 8 wherein the filter attributes are selected from the group consisting of an application inclusion filter, an application exclusion filter, a file size filter, and a last update filter.

14. A computer program product stored in a tangible computer readable memory, comprising functional descriptive material that, when executed by an information handling system, causes the information handling system to perform actions that include:

invoking a scheduled sync task that includes filter attributes to filter a plurality of memory pages corresponding to a plurality of files into a subset of memory pages;

selecting a plurality of file pointers that correspond to the plurality of files;

traversing through a logical file system using the selected plurality of file pointers, wherein the traversing includes analyzing a plurality of vnode data structures corresponding to the plurality of file pointers and obtaining logical file traversal information;

traversing through a physical file system using the logical file traversal information and extracting file attributes for each of the plurality of files;

filtering the plurality of files by comparing the filter attributes against the extracted file attributes;

extracting memory page identifiers corresponding to the filtered plurality of files, wherein the extracted memory page identifiers identify the subset of memory pages to synchronize; and synchronizing the subset of memory pages using the extracted memory page identifiers.

15. The computer program product of claim 14 wherein the information handling system further performs actions that include:

utilizing an application inclusion filter included in the filter attributes to identify an application;

identifying one or more active processes that correspond to the application;

identifying a user area for each of the identified one or more active processes; and extracting the selected plurality of file pointers from the identified one or more user areas.

16. The computer program product of claim 15 wherein the filter attributes include a first application file type and exclude a second application file type.

17. The computer program product of claim 15 wherein, during the traversing of the physical file system, the information handling system further performs actions that include:

analyzing a plurality of inode data structures included in the physical file system, the plurality of inode data structures corresponding to the plurality of files; and during the analysis, extracting segment control blocks from the plurality of inode data structures, wherein the segment control blocks include the memory page identifiers.

18. The computer program product of claim 17 wherein, during the traversing of the logical file system, the information handling system further performs actions that include steps of:

analyzing a plurality of gnode data structures.

19. The computer program product of claim 15 wherein the filter attributes are selected from the group consisting of an application inclusion filter, an application exclusion filter, a file size filter, and a last update filter.

20. The computer program product of claim 15 wherein the invoking is based upon a specified start time and a frequency occurrence that correspond to the scheduled sync task.

* * * * *